(12) United States Patent
Song et al.

(10) Patent No.: US 7,647,214 B2
(45) Date of Patent: Jan. 12, 2010

(54) METHOD FOR SIMULATING STABLE BUT NON-DISSIPATIVE WATER

(75) Inventors: Oh-Young Song, Seoul (KR);
Hyuncheol Shin, Seoul (KR);
Hyeong-Seok Ko, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 754 days.

(21) Appl. No.: 11/318,171

(22) Filed: Dec. 23, 2005

(65) Prior Publication Data

US 2007/0043544 A1 Feb. 22, 2007

Related U.S. Application Data

(60) Provisional application No. 60/639,353, filed on Dec. 27, 2004.

(51) Int. Cl.
*G06F 17/50* (2006.01)
*B41J 3/28* (2006.01)
(52) U.S. Cl. .............. 703/2; 703/9; 703/12; 347/19
(58) Field of Classification Search .............. 703/2, 703/9, 12; 347/6, 12, 19
See application file for complete search history.

(56) References Cited

U.S. PATENT DOCUMENTS

| 5,619,433 A * | 4/1997 | Wang et al. ............ 703/18 |
| 2005/0243117 A1 * | 11/2005 | Yu ............ 347/19 |
| 2005/0270312 A1 * | 12/2005 | Lad et al. ............ 347/1 |

* cited by examiner

*Primary Examiner*—Thai Phan
(74) *Attorney, Agent, or Firm*—John K. Park; Park Law Firm

(57) ABSTRACT

A method for graphically simulating stable but non-dissipative water in real-time includes steps for modeling multiphase materials with grid of nodes, suppressing numerical dissipation for getting rid of loss of mass of material, and suppressing numerical diffusion for reducing dampening of the fluid motion of materials in liquid phase. The step of modeling multiphase materials includes steps of describing liquid and gas with a set of nonlinear partial differential equations, representing the liquid-gas interface as an implicit surface, and determining properties of the materials, from the information about the liquid-gas interface, including the surface curvature and the surface tension. The set of nonlinear partial differential equations includes multiphase incompressible Navier-Stokes equations. The step of representing the liquid-gas interface includes a level set method.

20 Claims, 5 Drawing Sheets

METHOD FOR SIMULATING STABLE BUT NON-DISSIPATIVE WATER

RELATED APPLICATION

This application is a corresponding non-provisional application of U.S. Provisional Patent Application Ser. No. 60/639,353 for "Stable but Non-dissipative Water" filed on Dec. 27, 2004.

BACKGROUND OF THE INVENTION

The present invention relates to a method for simulating stable but non-dissipative water.

More particularly, this invention relates to a physically based method for simulating stable but non-dissipative water.

Water, which covers two thirds of the earth, undergoes myriad types of motion in its constant interactions with air, solids, and living creatures. Water has featured prominently in several recent feature animations, including Finding Nemo™ and Perfect Storm™. The success of those movies depended greatly on visual effects in the animation of water. Physically based approaches have been shown to effectively reproduce water movement, with quite impressive results.

However, several open challenges remain in this field. One key issue is speeding up the simulation of water. In the case of gaseous phenomena, interactive simulation methods already have been introduced by [Stam 1999]. The method is called semi-Lagrangian "stable fluids", which allows a large simulation time step to be used without causing instabilities. Unfortunately, this method is known to suffer from large amounts of numerical dissipation, which results in loss of mass. This is not important when simulating dissipative media such as fog or smoke, but it is not tolerable when animating intrinsically non-dissipative substances like water. Another undesirable property of the stable fluids method that must be noted is numerical diffusion, which dampens the fluid motion. Although damping is an inherent property of all fluids, the damping caused by numerical diffusion in the stable fluids method is too severe. Therefore, if we wish to simulate water using an approach based on the stable fluids method, we must modify that method so as to prevent the numerical dissipation and reduce the numerical diffusion.

The present invention presents a new physically based method for simulating water. The proposed method, which is based on the semi-Lagrangian "stable fluids", retains the speed and stability of the stable fluids technique while additionally including mechanisms to fix the problems of numerical dissipation and diffusion. To obtain nondissipative water, we adopt the constrained interpolation profile (CIP) method, which has been shown to remarkably reduce dissipation due to the use of coarse grids. To prevent dissipation due to the use of a large time step, we propose a novel particle-based approach, which we show to be quite effective at preventing dissipation of small-scale features. This particle-based approach is also used to simulate droplets and bubbles, which contributes to the overall visual realism. In addition, compared to existing methods, the proposed method simulates water-air interactions more accurately by employing the multiphase dynamic equations that account for the presence of air.

Early work on physically based simulation of water for graphics applications concentrated on animating the height-field representation of the water surface. To obtain interactive performance, researchers used the two dimensional (2D) approximation of the Navier-Stokes equations. Kass and Miller [1990] generated the height fields using an approximate version of the 2D shallow water equations. To simulate water-object interactions, Chen and Lobo [1995] solved the 2D Navier-Stokes equation that includes pressure. O'Brien and Hodgins [1995] proposed a method for simulating splashing liquids by integrating a particle system into a 2D height field model.

Height fields cannot be used to represent water that is undergoing a highly dynamic motion such as pouring. To handle such motions, researchers turned to the 3D Navier-Stokes equations. Foster and Metaxas [1996; 1997a] animated 3D liquids by modifying the Marker and Cell method proposed by Harlow and Welch [1965]. In addition, Foster and Metaxas simulated gases by using an explicit finite difference approximation of the Navier-Stokes equations [1997b]. Stam [1999] introduced the unconditionally stable fluid model, which utilizes the semi-Lagrangian method in combination with an implicit solver. This model gave significantly improved simulation speeds, but suffered from numerical dissipation. To reduce the dissipation in simulations of gaseous fluids, Fedkiw et al. [Fedkiw et al. 2001] proposed the use of vorticity confinement and cubic interpolation. Based on the stable semi-Lagrangian framework, Treuille et al. [2003] proposed a constrained optimization technique for keyframe control of smoke simulations, Rasmussen et al. [2003] proposed an efficient method for depicting large-scale gaseous phenomena, and Feldman et al. [2003] proposed an explosion model that incorporated a particle-based combustion model into the semi-Lagrangian framework.

In order to handle 3D liquids, the semi-Lagrangian scheme must be augmented with a robust and accurate method for tracking the liquid surface. To address this issue, Foster and Fedkiw [2001] proposed a novel method for representing a dynamically evolving liquid surface, which was based on combining the level set method with massless marker particles. Enright et al. [2002] improved this hybrid scheme by introducing the "particle level set method" which could capture water surface with a remarkable accuracy. Takahashi et al. [2003] simulated multiphase fluids by employing the CIP method coupled with the volume of fluid scheme; their method simulated the water-air interaction properly, instead of simulating water in a void space. When we are to animate water at an interactive rate, as demonstrated by Stam [1999] in the case of gas, then the use of large time steps should be allowed. But it can cause dissipation of mass. In [Foster and Fedkiw 2001; Enright et al. 2002], the time step size had to be restricted to prevent loss of mass. Although the CIP scheme used by Takahashi et al. [2003] lessened the degree of the dissipation, loss of mass was still noticeable when large time steps were used.

Several particle-based methods have been proposed as alternatives to the above grid-based approaches. Miller and Pearce [1989] simulated fluid behavior using particles connected with viscous springs. Terzopoulos et al. [1989] adopted a molecular dynamics model to simulate particles in the liquid phase. Stam and Fiume [1995] introduced "smoothed particle hydrodynamics" (SPH) to depict fire and gaseous phenomena. In SPH, the fluid is modeled as a collection of particles with a smoothed potential field. Premoze et al. [2003] introduced the use of the moving particle semi-implicit method (MPS) for simulating incompressible multiphase fluids. One drawback of particle-based methods is that, if insufficient particles are used, they tend to produce grainy surfaces. To prevent this, a sufficiently large number of particles must be used, which increases the computational cost.

Accordingly, a need for a method for simulating stable but non-dissipative water has been present for a long time. This invention is directed to solve these problems and satisfy the long-felt need.

SUMMARY OF THE INVENTION

The present invention contrives to solve the disadvantages of the prior art.

An objective of the invention is to provide a method for simulating stable but non-dissipative water.

Another objective of the invention is to provide a physically based method for simulating stable but non-dissipative water.

Still another objective of the invention is to provide a physically based method for simulating stable but non-dissipative water using a multiphase fluid formulation by combining the Navier-Stokes equations with the level set method.

Still another objective of the invention is to provide a physically based method for simulating the interaction of water with surrounding air, instead of simulating water in a void space.

Still another objective of the invention is to provide a physically based method for simulating stable but non-dissipative water which does not unnecessarily lose mass and its motion.

A method for graphically simulating stable but non-dissipative water in real-time includes steps for:

a) modeling multiphase materials with grid of nodes for dealing with the multiphase behaviors including the dynamics of the borders between liquids and gas;

b) suppressing numerical dissipation for getting rid of loss of mass of material of one phase from numerical dissipations due to the coarseness of the modeling of the materials in terms of grid of nodes; and c) suppressing numerical diffusion for reducing dampening of the fluid motion of materials in liquid phase.

The step of modeling multiphase materials includes steps of:

a) describing liquid and gas with a set of nonlinear partial differential equations that describe the flow of the fluids;

b) representing the liquid-gas interface as an implicit surface; and c) determining properties of the materials, from the information about the liquid-gas interface, including the surface curvature and the surface tension.

The set of nonlinear partial differential equations includes multiphase incompressible Navier-Stokes equations, and the flow of fluid is described by $$\nabla \cdot u = 0,$$

and $$\frac{\partial u}{\partial t} = -u \cdot \nabla u + \frac{f}{\rho} + \frac{\nu}{\rho}\nabla^2 u - \frac{\nabla p}{\rho}.$$

u denotes the velocity field of the fluid, p pressure, $\rho$ the density, $\nu$ the kinetic viscosity, and f represents the external forces per volume.

The step of representing the liquid-gas interface includes a level set method.

The level set method includes a level set equation, $\phi$, an implicit signed distance function defined to be positive for liquid and negative for gas, and the sign of $\phi$ determines the density and viscosity of the medium.

The surface of liquid is obtained by tracking the locations for $\phi=0$.

The set of nonlinear partial differential equations includes multiphase incompressible Navier-Stokes equations, and the step of representing the liquid-gas interface comprises a level set equation, $\phi$.

The liquid evolves dynamically in space and time according to the underlying fluid velocity field, u. The level set function changes according to the dynamical evolution of liquid and is updated by the level set equation, $$\frac{\partial \phi}{\partial t} + u \cdot \nabla \phi = 0.$$

The flow of fluid is described by the incompressible Navier-Stokes equations:

$$\nabla \cdot u = 0; \qquad \text{a)}$$

and $$\frac{\partial u}{\partial t} = -u \cdot \nabla u + \frac{f}{\rho} + \frac{\nu}{\rho}\nabla^2 u - \frac{\nabla p}{\rho}, \qquad \text{b)}$$

u denotes the velocity field of the fluid, p pressure, $\rho$ the density, $\nu$ the kinetic viscosity, and f represents the external forces per volume.

The liquid evolves dynamically in space and time according to the underlying fluid velocity field, u. The level set function changes according to the dynamical evolution of liquid and is updated by the level set equation, $$\frac{\partial \phi}{\partial t} + u \cdot \nabla \phi = 0.$$

The method may further include the step of solving the incompressible Navier-Stokes equations and the level set equation at each time step.

The step of solving the incompressible Navier-Stokes equations and the level set equation comprises steps of:

a) advecting the level set according to the level set equation;

b) updating the velocity by solving the Navier-Stokes equations; and c) simulating droplets and bubbles, where the level set function $\phi$ and the fluid velocity field u are updated.

The step of advecting the level set includes a step of updating the density and viscosity fields appearing in the Navier-Stokes equation.

The step of updating the velocity includes steps of:

a) calculating the advection component $u \cdot \nabla u$ using the semi-Lagrangian method;

b) applying the forces $f/\rho$;

c) adding the effect of the viscous term $\nu/\rho \nabla^2 u$ by employing implicit central differencing; and d) projecting the velocity field so that the condition $\nabla \cdot u = 0$ is met.

The semi-Lagrangian method includes a step of calculating a function value by referring to the advection at $x - u\Delta t$, wherein the function value is obtained by linearly interpolating the function values at the neighboring grid points.

The step of calculating the advection component includes steps of:

a) applying the Constrained Interpolation Profile (CIP) method of using the function values at the grid points and the spatial derivatives at those points for constructing the profile inside the grid cell; and b) solving the level set equation to advect the level set values.

With the CIP method, the profile corresponding to the interval $[x_i, x_{i+1}]$ in the one-dimensional case is represented by the third order polynomial, $$\Phi(X)=[(aX+b)X+\phi_i']X+\phi_i,$$

where $X=x-x_i$ for $x\in[x_i,x_{i+1}]$, and the coefficients are expressed in terms of four conditions $\phi_i$, $\phi_i'$, $\phi_{i+1}$, and $\phi_{i+1}'$ at the grid points, $$a=(\phi_i'+\phi_{i+1}')/\Delta x^2 - 2\Delta\phi/\Delta x^3,$$

$$b=3\Delta\phi/\Delta x^2 - (2\phi_i'+\phi_{i+1}')/\Delta x^2,$$

where $\Delta x = x_{i+1}-x_i$ and $\Delta\phi=\phi_{i+1}-\phi_i$.

The step of solving the level set equation includes steps of:

a) differentiating the level set equation to get $$\frac{\partial \phi_\xi}{\partial t} + u \cdot \nabla \phi_\xi = -u_\xi \cdot \nabla \phi,$$

where $\phi_\xi = \partial\phi/\partial\xi$, $u_\xi = \partial u/\partial\xi$, and $\xi$ is one of the spatial variables x, y, and z;

b) solving the non-advective part $\partial\phi_\xi/\partial t = -u_\xi \cdot \nabla\phi$ using finite differencing; and c) advecting the result according to $$\frac{\partial \phi_\xi}{\partial t} + u \cdot \nabla \phi_\xi = 0,$$

where the advected results $\phi_j$ and $\phi_j'$ for a grid point $x_j$ backtraced to $x_r \in [x_i, x_{i+1}]$ are obtained as $\phi_j = \Phi(X_r)$ and $\phi_j' = \Phi'(X_r)$, wherein $X_r = x_r - x_i$.

The step of calculating the profile $\Phi$ includes a step of applying a monotonic CIP method to the grid points in which oscillations are present, that is the value $\Phi(X_r)$ lies outside the range $[\phi_i, \phi_{i+1}]$.

The monotonic CIP method includes a step of modifying the derivatives $\phi_i'$ and $\phi_{i+1}'$ by using a polynomial function giving a monotonic profile instead of a rational function.

The CIP method includes a step of approximating the second order and higher derivatives by finite differencing of the first order derivatives in a three-dimensional calculation.

The force includes gravity and surface tension, wherein the gravity is $\rho g$, where g is the gravitational acceleration, and the surface tension is given by $f_{st} = -\rho\sigma\kappa(\phi)\delta_\epsilon(\phi)\nabla\phi$, where $\sigma$ is a constant coefficient, $\kappa$ is the local curvature, and $\delta_\epsilon$ is a smeared delta function, $$\delta_\epsilon = \frac{1}{2\epsilon} + \frac{1}{2\epsilon}\cos\left(\frac{\pi\phi}{\epsilon}\right) \quad : \quad |\phi| \le \epsilon,$$
$$= 0 \quad : \quad \text{otherwise,}$$

otherwise, where $\epsilon$ is a smearing width.

The step of simulating droplets and bubbles includes steps of:

a) locating the droplets or bubbles;

b) simulating the region with Lagrangian motion based on particle dynamics;

c) reducing the level set values of the region to values that are small for the droplets and negating the original level set values for the bubbles such that the region will not be mistakenly processed by the level set method; and d) restituting the droplets or bubbles into the grid-based fluid model.

The droplets or bubbles in the step of simulating the region with Lagrangian motion experiences gravitational, drag forces, and pressure from the surrounding fluid, $$f = m_f g + \alpha_d r^2 (\bar{u}-\dot{x})\|\bar{u}-\dot{x}\| - V_f \nabla p,$$

where $m_f$ is the mass, $V_f$ is the volume, $\alpha_d$ is the drag coefficient, r is the radius, $\dot{x}$ is the current velocity of the droplet or bubble, and $\bar{u}$ is the interpolated velocity of the grid-based fluid measured at the center of the droplet or bubble.

The step of restituting the droplets or bubbles includes steps of:

a) locating the droplets or bubbles in which the volume of the droplet or bubble is larger than at least two times the cell size; and b) removing the droplet or bubble, updating the level set values by $\phi(x_i) = s_p(r_p - |x_i - x_p|)$, and setting the grid point velocities to the velocity of the droplet or bubble, wherein $s_p = +1$ for the case of liquid droplet and $-1$ for the case of gas bubble, $r_p$ is the radius of the droplet or bubble, $x_p$ is the center of the droplet or bubble, and $x_i$ is the grid point being updated.

The step of restituting the droplets or bubbles includes steps of:

a) locating the droplet or bubble which hits the surface or moves into the same phase fluid;

b) updating the cell velocity by taking the average of the previous cell velocity and the velocity of droplet or bubble; and c) determining the new level set values for the cells covering the droplet or bubble using the volume of the droplets or bubbles.

The method may further include steps of:

a) generating multiple droplets or bubbles of smaller size to produce splashes and bubbles of smaller scales;

b) modeling the geometrical shape of the droplet or bubble as an ellipsoid, wherein the eccentricity of the ellipsoid depends on the velocity of the droplet or bubble; and c) assigning to the surfacing bubbles a life time that is inversely proportional to the bubble size.

The method may further include a step of reinitializing the level set values to maintain the signed distance property using $$\frac{\partial \phi}{\partial \tau} + sgn(\phi)(|\nabla \phi| - 1) = 0,$$

where $\tau$ is a fictitious time and $sgn(\phi)$ is a smeared signum function given by $$sgn(\phi) = \frac{\phi}{\sqrt{\phi^2 + |\nabla\phi|^2 (\Delta x)^2}}.$$

The method may further include a step of simulating interaction with rigid objects, wherein the step comprises steps of:

a) removing the normal component of the fluid velocity vector on the surface of the rigid objects;

b) applying the total external force F and moment T acting on the center of mass $r_c$ of the rigid body as $$F = Mg + \sum_s (-\nabla p_s \cdot n_s) n_s \Delta S,$$

$$T = \sum_s (r_s - r_c) \times (-\nabla p_s \cdot n_s) n_s \Delta S,$$

where M is the mass of the object, s is the index ranging over the marked cells, $p_s$ is the fluid pressure of the cell, $r_s$ is the position of the cell, $n_s$ is a normal vector to the surface, and $\Delta S$ is the area of the object surface subsumed in the cell.

The method may further include a step of blocking mass dissipation by compensating the liquid volume by $\Delta V_i = V_0 - V_i$ at the end of each simulation step, wherein the initial volume $V_i$ and the area of liquid surface $S_i$ are calculated as $$V_i = \int_\Omega H(\phi(x)) dx \approx \sum H_\varepsilon(\phi(x)) \Delta x \Delta y \Delta z + V_p,$$

$$S_i = \int_\Omega \delta(\phi(x)) |\nabla \phi(x)| dx \approx \sum \delta_\varepsilon(\phi(x)) |\nabla \phi(x)| \Delta x \Delta y \Delta z,$$

where $V_p$ is the total volume of the droplets.

In other embodiment of the invention, a system for simulating stable but non-dissipative water includes the modules for:

a) modeling multiphase materials with grid of nodes;

b) describing liquid and gas with a set of nonlinear partial differential equations, incompressible Navier-Stokes equations, that describe the flow of the fluids;

c) representing the liquid-gas interface as an implicit surface using the level set equation;

d) determining properties of the materials, from the information about the liquid-gas interface, including the surface curvature and the surface tension;

e) solving the incompressible Navier-Stokes equations and the level set equation at each time step;

f) advecting the level set according to the level set equation;

g) updating the velocity by solving the Navier-Stokes equations;

h) identifying the droplets and bubbles, simulating the region with Lagrangian motion based on particle dynamics, reducing the level set values of the region to values that are small for the droplets and negating the original level set values for the bubbles such that the region will not be mistakenly processed by the level set method, and restituting the droplets or bubbles into the grid-based fluid model;

i) locating the droplets or bubbles in which the volume of the droplet or bubble is larger than at least two times the cell size, and removing the droplet or bubble, updating the level set values by $\phi(x_i) = s_p(r_p - |x_i - x_p|)$, and setting the grid point velocities to the velocity of the droplet or bubble, wherein $s_p = +1$ for the case of liquid droplet and $-1$ for the case of gas bubble, $r_p$ is the radius of the droplet or bubble, $x_p$ is the center of the droplet or bubble, and $x_i$ is the grid point being updated;

j) locating the droplet or bubble which hits the surface or moves into the same phase fluid;

k) updating the cell velocity by taking the average of the previous cell velocity and the velocity of droplet or bubble;

l) determining the new level set values for the cells covering the droplet or bubble using the volume of the droplets or bubbles;

m) removing the normal component of the fluid velocity vector on the surface of the rigid objects;

n) applying the total external force F and moment T acting on the center of mass $r_c$ of the rigid body as $$F = Mg + \sum_s (-\nabla p_s \cdot n_s) n_s \Delta S,$$

$$T = \sum_s (r_s - r_c) \times (-\nabla p_s \cdot n_s) n_s \Delta S,$$

where M is the mass of the object, s is the index ranging over the marked cells, $p_s$ is the fluid pressure of the cell, $r_s$ is the position of the cell, and $\Delta S$ is the area of the object surface subsumed in the cell; and o) compensating the liquid volume by $\Delta V_i = V_0 - V_i$ at the end of each simulation step, wherein the initial volume $V_i$ and the area of liquid surface $S_i$ are calculated as $$V_i = \int_\Omega H(\phi(x)) dx \approx \sum H_\varepsilon(\phi(x)) \Delta x \Delta y \Delta z + V_p,$$

$$S_i = \int_\Omega \delta(\phi(x)) |\nabla \phi(x)| dx \approx \sum \delta_\varepsilon(\phi(x)) |\nabla \phi(x)| \Delta x \Delta y \Delta z,$$

where $V_p$ is the total volume of the droplets.

The advantages of the present invention are: (1) the method for simulating stable but non-dissipative water is a physically based method for simulating stable but non-dissipative water; (2) the method provides a physically based method for simulating stable but non-dissipative water using a multiphase fluid formulation by combining the Navier-Stokes equations with the level set method; (3) the method provides a physically based method for simulating the interaction of water with surrounding air, instead of simulating water in a void space; and (4) the method provides a physically based method for simulating stable but non-dissipative water which does not unnecessarily lose mass and its motion.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

The U.S. Provisional Patent Application Ser. No. 60/639,353 and the paper, ACM Transactions on Graphics, Volume 24, No. 1 (January 2005), pp. 81-97, by the applicants are incorporated by reference into this disclosure as if fully set forth herein.

A method for graphically simulating stable but non-dissipative water in real-time includes steps for:

a) modeling multiphase materials with grid of nodes for dealing with the multiphase behaviors including the dynamics of the borders between liquids and gas;

b) suppressing numerical dissipation for getting rid of loss of mass of material of one phase from numerical dissipations due to the coarseness of the modeling of the materials in terms of grid of nodes; and c) suppressing numerical diffusion for reducing dampening of the fluid motion of materials in liquid phase.

The step of modeling multiphase materials includes steps of:

a) describing liquid and gas with a set of nonlinear partial differential equations that describe the flow of the fluids;

b) representing the liquid-gas interface as an implicit surface; and c) determining properties of the materials, from the information about the liquid-gas interface, including the surface curvature and the surface tension.

The set of nonlinear partial differential equations includes multiphase incompressible Navier-Stokes equations, and the flow of fluid is described by $$\nabla \cdot u = 0,$$

and $$\frac{\partial u}{\partial t} = -u \cdot \nabla u + \frac{f}{\rho} + \frac{\nu}{\rho}\nabla^2 u - \frac{\nabla \rho}{\rho}.$$

u denotes the velocity field of the fluid, p pressure, ρ the density, ν the kinetic viscosity, and f represents the external forces per volume.

The step of representing the liquid-gas interface includes a level set method.

The level set method includes a level set equation, φ, an implicit signed distance function defined to be positive for liquid and negative for gas, and the sign of φ determines the density and viscosity of the medium.

The surface of liquid is obtained by tracking the locations for φ=0.

The set of nonlinear partial differential equations includes multiphase incompressible Navier-Stokes equations, and the step of representing the liquid-gas interface comprises a level set equation, φ. A first material of one phase is assigned to be a first predetermined value, a second material of the second phase is assigned to be a second predetermined value, and the interface between the first and second materials is assigned to be a third values between the first predetermined value and the second predetermined value.

The flow of fluid is described by $$\nabla \cdot u = 0,$$

and $$\frac{\partial u}{\partial t} = -u \cdot \nabla u + \frac{f}{\rho} + \frac{\nu}{\rho}\nabla^2 u - \frac{\nabla \rho}{\rho}.$$

u denotes the velocity field of the fluid, p pressure, ρ the density, ν the kinetic viscosity, and f represents the external forces per volume.

The liquid evolves dynamically in space and time according to the underlying fluid velocity field, u. The level set function changes according to the dynamical evolution of liquid and is updated by the level set equation, $$\frac{\partial \phi}{\partial t} + u \cdot \nabla \phi = 0.$$

The flow of fluid is described by the incompressible Navier-Stokes equations:

a) $\nabla \cdot u = 0;$ and b) $\frac{\partial u}{\partial t} = -u \cdot \nabla u + \frac{f}{\rho} + \frac{\nu}{\rho}\nabla^2 u - \frac{\nabla \rho}{\rho},$ u denotes the velocity field of the fluid, p pressure, ρ the density, ν the kinetic viscosity, and f represents the external forces per volume.

The liquid evolves dynamically in space and time according to the underlying fluid velocity field, u. The level set function changes according to the dynamical evolution of liquid and is updated by the level set equation, $$\frac{\partial \phi}{\partial t} + u \cdot \nabla \phi = 0.$$

The method may further include the step of solving the incompressible Navier-Stokes equations and the level set equation at each time step.

The step of solving the incompressible Navier-Stokes equations and the level set equation comprises steps of:

a) advecting the level set according to the level set equation;

b) updating the velocity by solving the Navier-Stokes equations; and c) simulating droplets and bubbles, where the level set function φ and the fluid velocity field u are updated.

The step of advecting the level set includes a step of updating the density and viscosity fields appearing in the Navier-Stokes equation.

The step of updating the velocity includes steps of:

a) calculating the advection component u·∇u using the semi-Lagrangian method;

b) applying the forces f/ρ;

c) adding the effect of the viscous term $\nu/\rho\nabla^2 u$ by employing implicit central differencing; and d) projecting the velocity field so that the condition ∇·u=0 is met.

The semi-Lagrangian method includes a step of calculating a function value by referring to the advection at x−uΔt, wherein the function value is obtained by linearly interpolating the function values at the neighboring grid points.

The step of calculating the advection, component includes steps of:

a) applying the Constrained Interpolation Profile (CIP) method of using the function values at the grid points and the spatial derivatives at those points for constructing the profile inside the grid cell; and b) solving the level set equation to advect the level set values.

Figure 1:
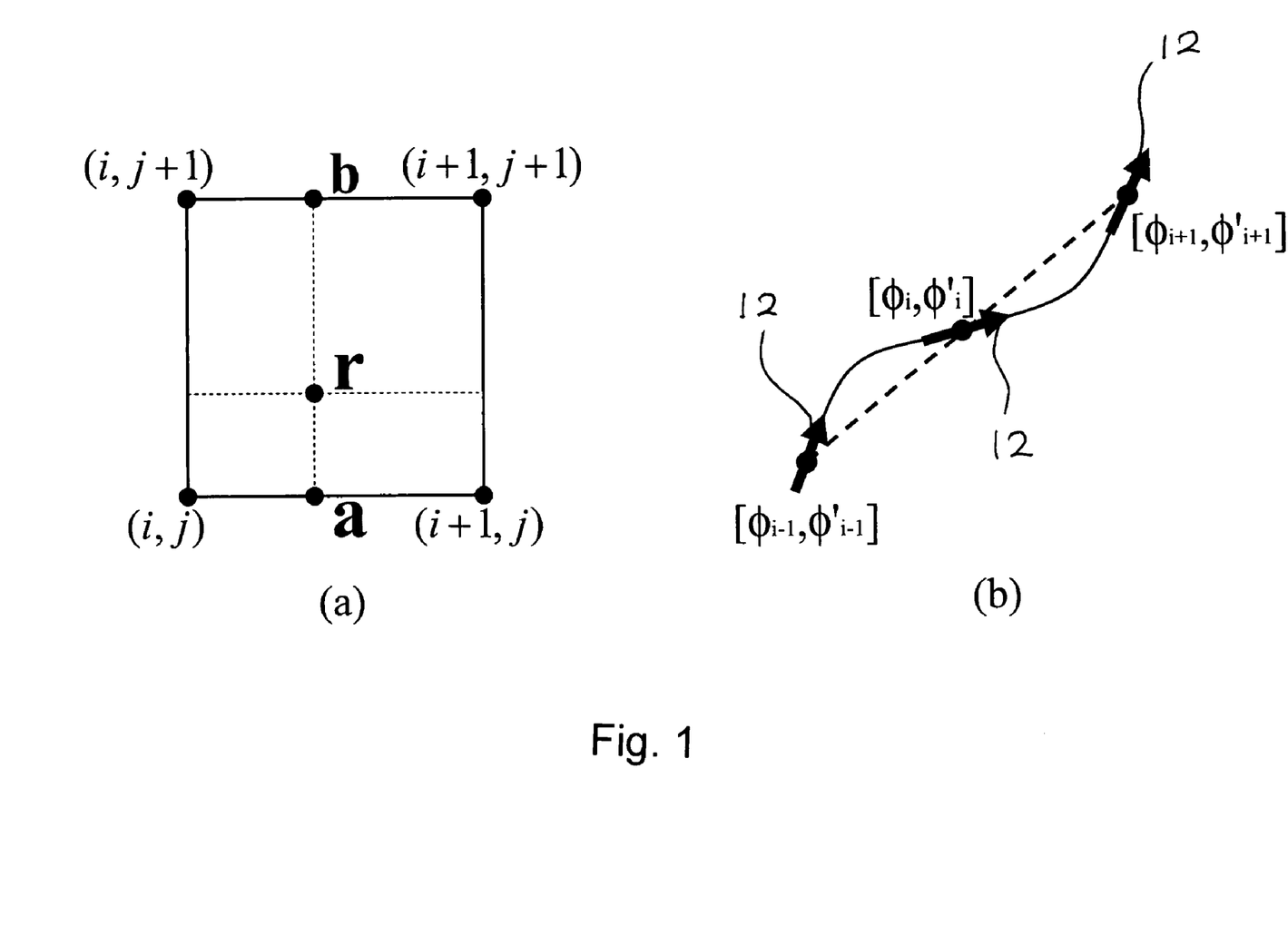
FIG. 1a is a diagram showing two-dimensional CIP interpolation.
FIG. 1b is a schematic diagram of a situation where three level set values are aligned.

Since CIP utilizes the spatial derivatives 12 of the original equation as shown in FIG. 1b, the CIP method allows to use a fairly coarse grid.

With the CIP method, the profile corresponding to the interval $[x_i,x_{i+1}]$ in the one-dimensional case is represented by the third order polynomial, $$\Phi(X)=[(aX+b)X+\phi_i']X+\phi_i,$$

where $X=x-x_i$ for $x\in[x_i,x_{i+1}]$, and the coefficients are expressed in terms of four conditions $\phi_i$, $\phi_i'$, $\phi_{i+1}$, and $\phi_{i+1}'$ at the grid points, $$a=(\phi_i'+\phi_{i+1}')/\Delta x^2-2\Delta\phi/\Delta x^3,$$

$$b=3\Delta\phi/\Delta x 2-(2\phi_i'+\phi_{i+1}')/\Delta x^2,$$

where $\Delta x=x_{i+1}-x_i$ and $\Delta\phi=\phi_{i+1}-\phi_i$.

The two-dimensional case of CIP is shown in FIG. 1a.

The step of solving the level set equation includes steps of:

a) differentiating the level set equation to get $$\frac{\partial\phi_\xi}{\partial t}+u\cdot\nabla\phi_\xi=-u_\xi\cdot\nabla\phi,$$

where $\phi_\xi=\partial\phi/\partial\xi$, $u_\xi=\partial u/\partial\xi$, and $\xi$ is one of the spatial variables x, y, and z;

b) solving the non-advective part $\partial\phi_\xi/\partial t=-u_\xi\cdot\nabla\phi$ using finite differencing; and d) advecting the result according to $$\frac{\partial\phi_\xi}{\partial t}+u\cdot\nabla\phi_\xi=0,$$

where the advected results $\phi_j$ and $\phi_j'$ for a grid point $x_j$ backtraced to $x_r\in[x_i,x_{i+1}]$ are obtained as $\phi_j=\Phi(X_r)$ and $\phi_j'=\Phi'(X_r)$, wherein $X_r=x_r-x_i$.

The step of calculating the profile $\Phi$ includes a step of applying a monotonic CIP method to the grid points in which oscillations are present, that is the value $\Phi(X_r)$ lies outside the range $[\phi_i, \phi_{i+1}]$.

The monotonic CIP method includes a step of modifying the derivatives $\phi_i'$ and $\phi_{i+1}'$ by using a polynomial function giving a monotonic profile instead of a rational function.

Figure 3:
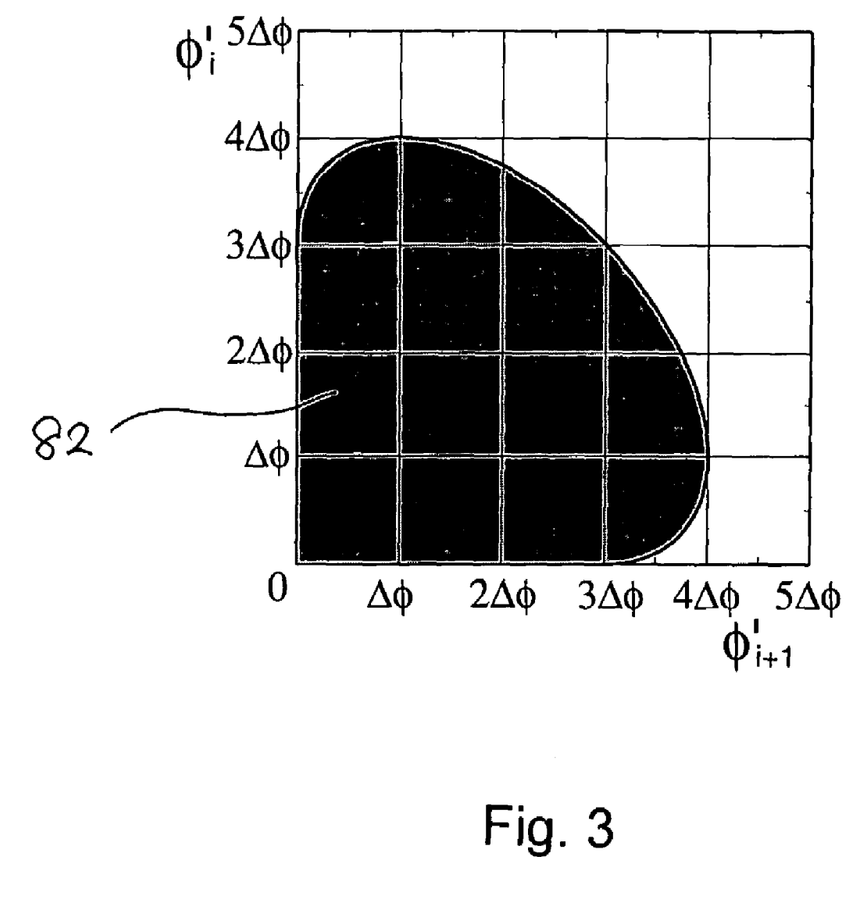
FIG. 3 is a plot of $(\phi_i', \phi_{i+1}')$ showing a region corresponding to the condition for monotonic profiles in the case of $\Delta\phi \geqq 0$.

The region 82 inside the cell 80 for monotonic increasing is shown in FIG. 3.

The CIP method includes a step of approximating the second order and higher derivatives by finite differencing of the first order derivatives in a three-dimensional calculation.

The force includes gravity and surface tension, wherein the gravity is $\rho g$, where g is the gravitational acceleration, and the surface tension is given by $f_{st}=-\rho\sigma\kappa(\phi)\delta_\epsilon(\phi)\nabla\phi$, where $\sigma$ is a constant coefficient, $\kappa$ is the local curvature, and $\delta_\epsilon$ is a smeared delta function, $$\delta_\epsilon = \frac{1}{2\epsilon}+\frac{1}{2\epsilon}\cos\left(\frac{\pi\phi}{\epsilon}\right) \quad : \quad |\phi|\le\epsilon,$$

$$= 0 \quad : \quad \text{otherwise},$$

otherwise, where $\epsilon$ is a smearing width.

The step of simulating droplets and bubbles includes steps of:

a) locating the droplets or bubbles;

b) simulating the region with Lagrangian motion based on particle dynamics;

c) reducing the level set values of the region to values that are small for the droplets and negating the original level set values for the bubbles such that the region will not be mistakenly processed by the level set method; and d) restituting the droplets or bubbles into the grid-based fluid model.

The droplets or bubbles in the step of simulating the region with Lagrangian motion experiences gravitational, drag forces, and pressure from the surrounding fluid, $$f=m_f g+\alpha_d r^2(\bar{u}-\dot{x})\|\bar{u}-\dot{x}\|-V_f\nabla p,$$

where $m_f$ is the mass, $V_f$ is the volume, $\alpha_d$ is the drag coefficient, r is the radius, $\dot{x}$ is the current velocity of the droplet or bubble, and $\bar{u}$ is the interpolated velocity of the grid-based fluid measured at the center of the droplet or bubble.

The step of restituting the droplets or bubbles includes steps of:

a) locating the droplets or bubbles in which the volume of the droplet or bubble is larger than at least two times the cell size; and b) removing the droplet or bubble, updating the level set values by $\phi(x_i)=s_p(r_p-|x_i-x_p|)$, and setting the grid point velocities to the velocity of the droplet or bubble, wherein $s_p=+1$ for the case of liquid droplet and $-1$ for the case of gas bubble, $r_p$ is the radius of the droplet or bubble, $x_p$ is the center of the droplet or bubble, and $x_i$ is the grid point being updated.

The step of restituting the droplets or bubbles includes steps of:

a) locating the droplet or bubble which hits the surface or moves into the same phase fluid;

b) updating the cell velocity by taking the average of the previous cell velocity and the velocity of droplet or bubble; and c) determining the new level set values for the cells covering the droplet or bubble using the volume of the droplets or bubbles.

The method may further include steps of:

a) generating multiple droplets or bubbles of smaller size to produce splashes and bubbles of smaller scales;

b) modeling the geometrical shape of the droplet or bubble as an ellipsoid, wherein the eccentricity of the ellipsoid depends on the velocity of the droplet or bubble; and c) assigning to the surfacing bubbles a life time that is inversely proportional to the bubble size.

The method may further include a step of reinitializing the level set values to maintain the signed distance property using $$\frac{\partial\phi}{\partial\tau}+sgn(\phi)(|\nabla\phi|-1)=0,$$

where $\tau$ is a fictitious time and $sgn(\phi)$ is a smeared signum function given by $$sgn(\phi)=\frac{\phi}{\sqrt{\phi^2+|\nabla\phi|^2(\Delta x)^2}}.$$

The method may further include a step of simulating interaction with rigid objects, wherein the step comprises steps of:

a) removing the normal component of the fluid velocity vector on the surface of the rigid objects;

b) applying the total external force F and moment T acting on the center of mass $r_c$ of the rigid body as $$F = Mg + \sum_s (-\nabla p_s \cdot n_s) n_s \Delta S,$$

$$T = \sum_s (r_s - r_c) \times (-\nabla p_s \cdot n_s) n_s \Delta S,$$

where M is the mass of the object, s is the index ranging over the marked cells, $p_s$ is the fluid pressure of the cell, $r_s$ is the position of the cell, $n_s$ is a normal vector to the surface, and $\Delta S$ is the area of the object surface subsumed in the cell.

The method may further include a step of blocking mass dissipation by compensating the liquid volume by $\Delta V_i = V_0 - V_i$ at the end of each simulation step, wherein the initial volume $V_i$ and the area of liquid surface $S_i$ are calculated as $$V_i = \int_\Omega H(\phi(x)) dx \approx \sum H_\varepsilon(\phi(x)) \Delta x \Delta y \Delta z + V_p,$$

$$S_i = \int_\Omega \delta(\phi(x)) |\nabla \phi(x)| dx \approx \sum \delta_\varepsilon(\phi(x)) |\nabla \phi(x)| \Delta x \Delta y \Delta z,$$

where $V_p$ is the total volume of the droplets.

Figure 2:
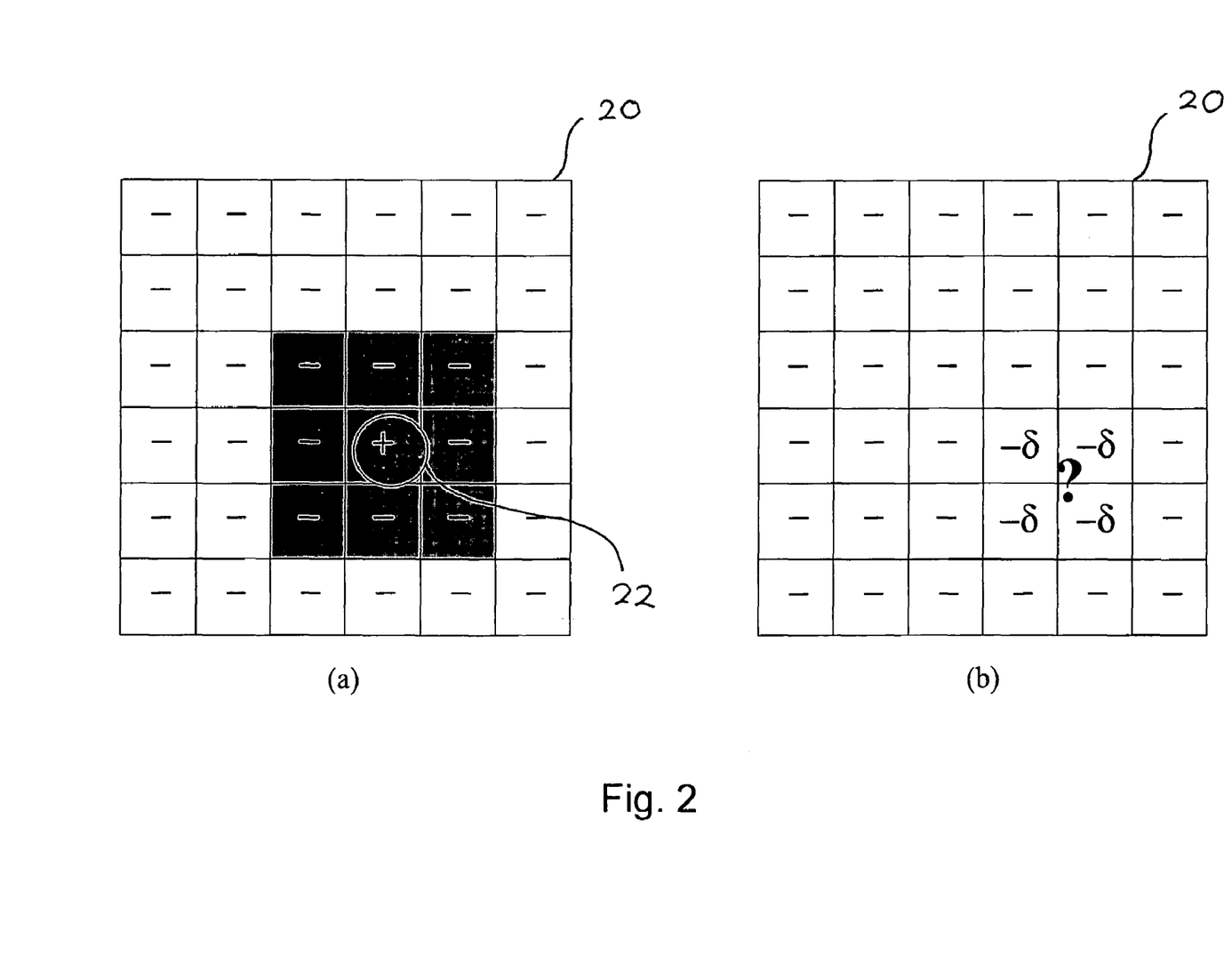
FIG. 2a is a diagram showing an apparent droplet on a grid.
FIG. 2b is a diagram showing an unapparent droplet on a grid.

In FIG. 2a, the isolated region 22 may be interpreted as a droplet. And, the droplet is represented by the level set method as the shaded cells 21 with negative level set values on the grid 20.

Figure 4:
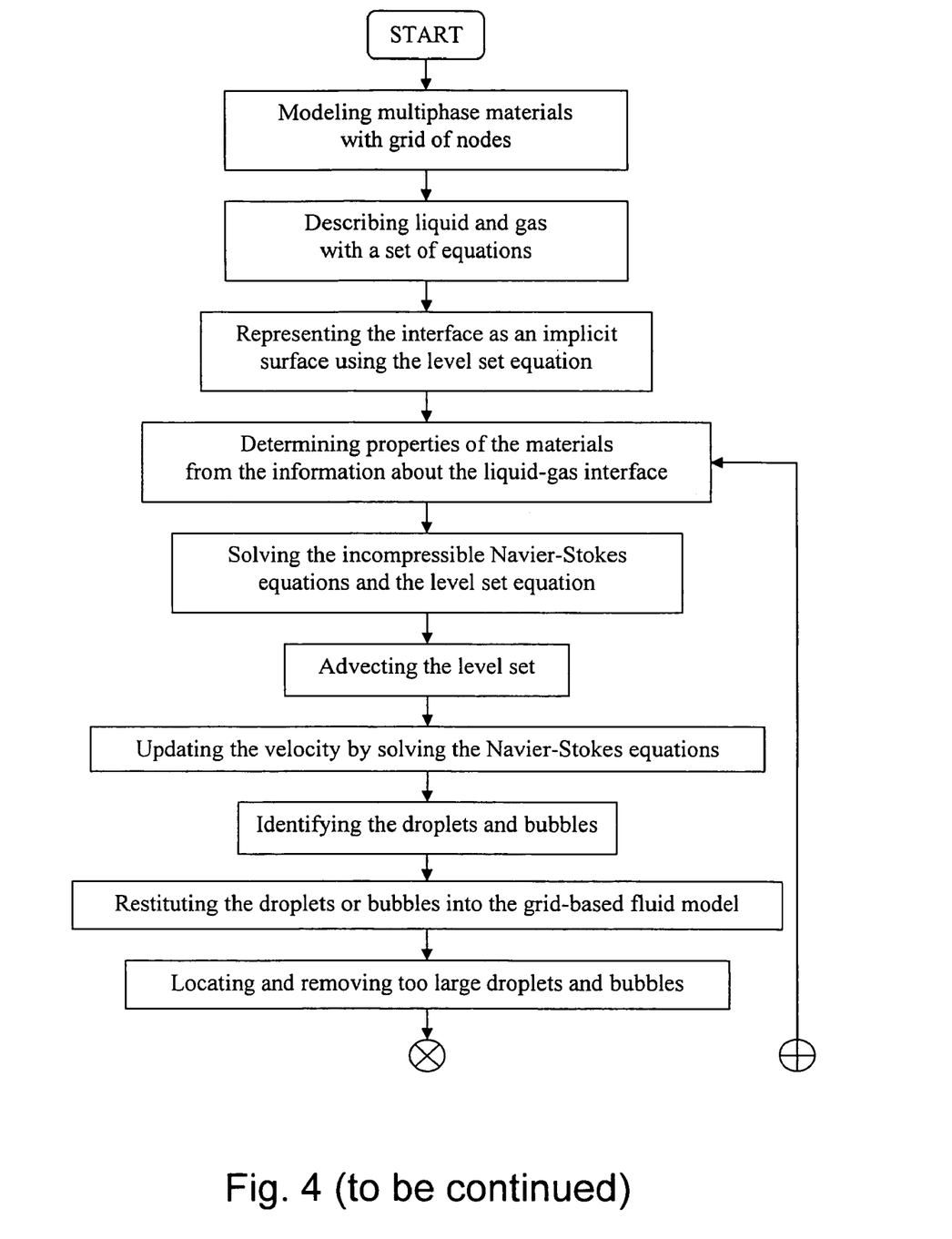
FIG. 4 is a flowchart for an embodiment of the present invention.

FIG. 4 shows a flowchart of the method according to the present invention.

In other embodiment of the invention, a system for simulating stable but non-dissipative water includes the modules for:

a) modeling multiphase materials with grid of nodes;

b) describing liquid and gas with a set of nonlinear partial differential equations, incompressible Navier-Stokes equations, that describe the flow of the fluids;

c) representing the liquid-gas interface as an implicit surface using the level set equation;

d) determining properties of the materials, from the information about the liquid-gas interface, including the surface curvature and the surface tension;

e) solving the incompressible Navier-Stokes equations and the level set equation at each time step;

f) advecting the level set according to the level set equation;

g) updating the velocity by solving the Navier-Stokes equations;

h) identifying the droplets and bubbles, simulating the region with Lagrangian motion based on particle dynamics, reducing the level set values of the region to values that are small for the droplets and negating the original level set values for the bubbles such that the region will not be mistakenly processed by the level set method, and restituting the droplets or bubbles into the grid-based fluid model;

i) locating the droplets or bubbles in which the volume of the droplet or bubble is larger than at least two times the cell size, and removing the droplet or bubble, updating the level set values by $\phi(x_i) = s_p(r_p - |x_i - x_p|)$, and setting the grid point velocities to the velocity of the droplet or bubble, wherein $s_p = +1$ for the case of liquid droplet and $-1$ for the case of gas bubble, $r_p$ is the radius of the droplet or bubble, $x_p$ is the center of the droplet or bubble, and $x_i$ is the grid point being updated;

j) locating the droplet or bubble which hits the surface or moves into the same phase fluid;

k) updating the cell velocity by taking the average of the previous cell velocity and the velocity of droplet or bubble;

l) determining the new level set values for the cells covering the droplet or bubble using the volume of the droplets or bubbles;

m) removing the normal component of the fluid velocity vector on the surface of the rigid objects;

n) applying the total external force F and moment T acting on the center of mass $r_c$ of the rigid body as $$F = Mg + \sum_s (-\nabla p_s \cdot n_s) n_s \Delta S,$$

$$T = \sum_s (r_s - r_c) \times (-\nabla p_s \cdot n_s) n_s \Delta S,$$

where M is the mass of the object, s is the index ranging over the marked cells, $P_s$ is the fluid pressure of the cell, $r_s$ is the position of the cell, and $\Delta S$ is the area of the object surface subsumed in the cell; and o) compensating the liquid volume by $\Delta V_{i=V0} - V_i$ at the end of each simulation step, wherein the initial volume $V_1$ and the area of liquid surface $S_i$ are calculated as $$V_i = \int_\Omega H(\Phi(x)) dx \approx \sum H_\varepsilon(\Phi(x)) \Delta x \Delta y \Delta z + V_p,$$

$$S_i = \int_\Omega \delta(\Phi(x)) |\nabla \Phi(x)| dx \approx \sum \delta_\varepsilon(\Phi(x)) |\nabla \Phi(x)| \Delta x \Delta y \Delta z,$$

where $V_p$, is the total volume of the droplets.

While the invention has been shown and described with reference to different embodiments thereof, it will be appreciated by those skilled in the art that variations in form, detail, compositions and operation may be made without departing from the spirit and scope of the invention as defined by the accompanying claims.

REFERENCES

BRACKBILL, J. U., KOTHE, D. B., AND ZEMACH, C. 1992. A continuum method for modeling surface tension. *J. Comp. Phys.* 100, 335-354.

CHEN, J. X. AND LOBO, N. D. V. 1995. Toward interactive-rate simulation of fluids with moving obstacles using Navier-Stokes equations. *Graphical models and image processing: GMIP* 57, 2, 107-116.

ENRIGHT, D., MARSCHNER, S., AND FEDKIW, R. 2002. Animation and rendering of complex water surfaces. *ACM Transactions on Graphics (Proc. ACM SIGGRAPH 2002)* 21, 3, 736-744.

FEDKIW, R., STAM, J., AND JENSEN, H. W. 2001. Visual simulation of smoke. *Computer Graphics (Proc. ACM SIGGRAPH 2001)* 35, 15-22.

FELDMAN, B. E., O'BRIEN, J. F., AND ARIKAN, O. 2003. Animating suspended particle explosions. *ACM Transactions on Graphics (Proc. ACM SIGGRAPH 2003)* 22, 3, 708-715.

FOSTER, N. AND FEDKIW, R. 2001. Practical animation of liquids. *Computer Graphics (Proc. ACM SIGGRAPH 2001)* 35, 23-30.

FOSTER, N. AND METAXAS, D. 1996. Realistic animation of liquids. *Graphical models and image processing: GMIP* 58, 5, 471-483.

FOSTER, N. AND METAXAS, D. 1997a. Controlling fluid animation. In *Computer Graphics International* 97. 178-188.

FOSTER, N. AND METAXAS, D. 1997b. Modeling the motion of a hot, turbulent gas. *Computer Graphics (Proc. ACM SIGGRAPH '97)* 31, Annual Conference Series, 181-188.

GOLUB, G. H. AND LOAN, C. F. V. 1996. *Matrix Computations*. The John Hopkins University Press.

HARLOW, F. H. AND WELCH, J. E. 1965. Numerical calculation of time-dependent viscous incompressible flow of fluid with free surface. *Phys. Fluids* 8, 12, 2182-2189.

KASS, M. AND MILLER, G. 1990.Rapid, stable fluid dynamics for computer graphics. *Computer Graphics (Proc. ACM SIGGRAPH '90)* 24, 4, 49-57.

LORENSEN, W. E. AND CLINE, H. E. 1987. Marching cubes: A high resolution 3D surface construction algorithm. *Computer Graphics (Proc. ACM SIGGRAPH '87)* 21, 4, 163-169.

MILLER, G. AND PEARCE, A. 1989.Globular dynamics: A connected particle system for animating viscous fluids. *Computers and Graphics* 13, 3, 305-309.

O'BRIEN, J. AND HODGINS, J. 1995. Dynamic simulation of splashing fluids. In *Proceedings of Computer Animation* 95. 198-205.

OSHER, S. AND FEDKIW, R. 2002. *The Level Set Method and Dynamic Implicit Surfaces*. Springer-Verlag, New York.

OSHER, S. AND SETHIAN; J. A. 1988. Fronts propagating with curvature dependent speed: Algorithms based in hamilton-jacobi formulations. *J. Comp. Phys.* 79, 12-49.

PENG, D., MERRIMAN, B., OSHER, S., ZHAO, H., AND KANG, M. 1999. A pde-based fast local level set method. *J. Comp. Phys.* 155, 410-438.

PREMOZ E, S., TASDIZEN, T., BIGLER, J., LEFOHN, A., AND WHITAKER, R. T. 2003. Particle-based simulation of fluids. In *Eurographics* 2003 *proceedings*. Blackwell Publishers, 401-410.

RASMUSSEN, N., NGUYEN, D. Q., GEIGER, W., AND FEDKIW, R. 2003. Smoke simulation for large scale phenomena. *ACM Transactions on Graphics (Proc. ACM SIGGRAPH* 2003) 22, 3, 703-707.

STAM, J. 1999. Stable fluids. Computer Graphics (Proc. *ACM SIGGRAPH '99*) 33, Annual Conference Series, 121-128.

STAM, J. AND FIUME, E. 1995. Depicting fire and other gaseous phenomena using diffusion processes. *Computer Graphics* (Proc. ACM SIGGRAPH '95) 29, Annual Conference Series, 129-136.

STANIFORTH, A. AND C^OT`E, J. 1991. Semi-lagrangian integration scheme for atmospheric model—a review. *Mon. Weather Rev.* 119, 12, 2206-2223.

SUSSMAN, M., SMEREKA, P., AND OSHER, S. 1994. A level set approach for computing solutions to incompressible two-phase flow. *J. Comp. Phys.* 114, 146-159.

TAKAHASHI, T., FUJII, H., KUNIMATSU, A., HIWADA, K., SAITO, T., TANAKA, K., AND UEKI, H. 2003. Realistic animation of fluid with splash and foam. In *Eurographics* 2003 *proceedings*. Blackwell Publishers, 391-400.

TERZOPOULOS, D., PLATT, J., AND FLEISCHER, K. 1989. Heating and melting deformable models (from goop to glop). In *Proceedings of Graphics Interface '89*. 219-226.

TREUILLE, A., MCNAMARA, A., POPOVI C , Z., AND STAM, J. 2003. Keyframe control of smoke simulations. *ACM Transactions on Graphics (Proc. ACM SIGGRAPH* 2003) 22, 3, 716-723.

XIAO, F., YABE, T., AND ITO, T. 1996. Constructing oscillation preventing scheme for advection equation by rational function. *Comp. Phys. Comm.* 93, 1-12.

YABE, T. AND AOKI, T. 1991. A universal solver for hyperbolic equations by cubic-polynomial interpolation i. one-dimensional solver. *Comp. Phys. Comm.* 66, 219-232.

YABE, T., XIAO, F., AND UTSUMI, T. 2001. The constrained interpolation profile method for multiphase analysis. *J. Comp. Phys.* 169, 556-593.

What is claimed is:

1. A method for graphically simulating stable but non-dissipative water in real-time comprising steps for:
   modeling multiphase materials with grid of nodes for dealing with the multiphase behaviors including the dynamics of the borders between liquids and gas;
   suppressing numerical dissipation for getting rid of loss of mass of material of one phase from numerical dissipations due to the coarseness of the modeling of the materials in terms of grid of nodes; and
   suppressing numerical diffusion for reducing dampening of the fluid motion of materials in liquid phase,
   wherein the flow of fluid is described by the incompressible Navier-Stokes equations:

$$\nabla \cdot u = 0;$$

and $$\frac{\partial u}{\partial t} = -u \cdot \nabla u + \frac{f}{\rho} + \frac{v}{\rho}\nabla^2 u - \frac{\nabla p}{\rho},$$

wherein u denotes the velocity field of the fluid, p pressure, $\rho$ the density, v the kinetic viscosity, and f represents the external forces per volume,
wherein the liquid evolves dynamically in space and time according to the underlying fluid velocity field, u, wherein the level set function changes according to the dynamical evolution of liquid and is updated by the level set equation, $$\frac{\partial \phi}{\partial t} + u \cdot \nabla \phi = 0,$$

further comprising tie step of solving the incompressible Navier-Stokes equations and the level set equation at each time step,
wherein the step of solving the incompressible Navier-Stokes equations and the level set equation comprises steps of:
   a) advecting the level set according to the level set equation;
   b) updating the velocity by solving the Navier-Stokes equations; and
   c) simulating droplets and bubbles,
wherein the level set function $\phi$ and the fluid velocity field u are updated.

2. The method of claim 1, wherein the step of advecting the level set comprises a step of updating the density and viscosity fields appearing in the Navier-Stokes equation.

3. The method of claim 1, wherein the step of updating the velocity comprises steps of:
   a) calculating the advection component $u \cdot \nabla u$ using the semi-Lagrangian method;
   b) applying the forces $f/\rho$;
   c) adding the effect of the viscous term $\nu/\rho \nabla^2 u$ by employing implicit central differencing; and
   d) projecting the velocity field so that the condition $\nabla \cdot u = 0$ is met.

4. The method of claim 3, wherein the semi-Lagrangian method comprises a step of calculating a function value by referring to the advection at $x - u\Delta t$, wherein the function value is obtained by linearly interpolating the function values at the neighboring grid points.

5. The method of claim 3, wherein the step of calculating the advection component comprises steps of:
   a) applying the Constrained Interpolation Profile (CIP) method of using the function values at the grid points and the spatial derivatives at those points for constructing the profile inside the grid cell; and
   b) solving the level set equation to advect the level set values.

6. The method of claim 5, wherein, with the CIP method, the profile corresponding to the interval $[x_i, x_{i+1}]$ in the one-dimensional case is represented by the third order polynomial, $$\Phi(X) = \{aX + b)X + \phi_i'\}X + \phi_i,$$

wherein $X = x - x_i$ for $x \in [x_i, x_{i+1}]$, wherein the coefficients are expressed in terms of four conditions $\phi_i, \phi_i', \phi_{i+1}$, and $\phi_{i+1}'$ at the grid points, $$a = \phi_i' + \phi_{i+1}')/\Delta x^2 - 2\Delta\phi/\Delta x^3,$$
$$b = 3\Delta\phi/\Delta x2 - (2\phi_i' + \phi_{i+1}')/\Delta x^2,$$

wherein $\Delta x = x_{i+1} - x_i$ and $\Delta \phi = \phi_{i+1} - \phi_i$.

7. The method of claim 6, wherein the step of solving the level set equation comprises steps of:
   a) differentiating the level set equation to get $$\frac{\partial \phi_\xi}{\partial t} + u \cdot \nabla \phi_\xi = -u_\xi \cdot \nabla \phi,$$

wherein $\phi_\xi = \partial \phi / \partial \xi$, and $u_\xi = \partial u / \partial \xi$, and $\xi$ is one of the spatial variables x, y, and z;
   b) solving the non-advective part $\partial \phi_\xi / \partial t = -u_\xi \cdot \nabla \phi$ using finite differencing; and
   c) advecting the result according to $$\frac{\partial \phi_\xi}{\partial t} + u \cdot \nabla \phi_\xi = 0,$$

wherein the advected results $\phi_j$ and $\phi_j'$ for a grid point $x_j$ backtraced to $x_r \in [X_i, X_{i+1}]$ are obtained as $\phi_j = \Phi(X_r)$ and $\phi_j' = \Phi'(X_r)$, wherein $X_r = x_r - x_i$.

8. The method of claim 7, wherein the step of calculating the profile $\Phi$ comprises a step of applying a monotonic CIP method to the grid points in which oscillations are present, that is the value $\Phi(X_r)$ lies outside the range $[\phi_i, \phi_{i+1}]$.

9. The method of claim 8, wherein the monotonic CIP method comprises a step of modifying the derivatives $\phi_i'$ and $\phi_{i+1}'$ by using a polynomial function giving a monotonic profile instead of a rational function.

10. The method of claim 7, further comprising a step of wherein the CIP method comprises a step of blocking mass dissipation by compensating the liquid volume by $\Delta V_i = V_0 - V_i$ at the end of each simulation step, wherein the initial volume $V_i$ and the area of liquid surface $S_i$ are calculated as $$V_i = \int_\Omega H(\phi(x))dx \approx \sum H_\varepsilon(\phi(x))\Delta x \Delta y \Delta z + V_p,$$
$$S_i = \int_\Omega \delta(\phi(x))|\nabla \phi(x)|dx \approx \sum \delta_\varepsilon(\phi(x))|\nabla \phi(x)|\Delta x \Delta y \Delta z,$$

where $V_p$ is the total volume of the droplets.

11. The method of claim 5, wherein the CIP method comprises a step of approximating the second order and higher derivatives by finite differencing of the first order derivatives in a three-dimensional calculation.

12. The method of claim 3, wherein the force comprises gravity and surface tension, wherein the gravity is $\rho g$, where g is the gravitational acceleration, wherein the surface tension is given by $f_{st} = -\rho \sigma \kappa(\phi) \delta_\varepsilon(\phi) \nabla \phi$, where $\sigma$ is a constant coefficient, $\kappa$ is the local curvature, and $\delta_\varepsilon$ is a smeared delta function, $$\delta_\varepsilon(\phi) = \frac{1}{2\varepsilon} + \frac{1}{2\varepsilon}\cos\left(\frac{\pi\phi}{\varepsilon}\right): \quad |\phi| \le \varepsilon,$$
$$= 0: \quad \text{otherwise,}$$

where $\varepsilon$ is a smearing width.

13. The method of claim 1, wherein the step of simulating droplets and bubbles comprises steps of:
   a) locating the droplets or bubbles;
   b) simulating the region with Lagrangian motion based on particle dynamics;
   c) reducing the level set values of the region to values that are small for the droplets and negating the original level set values for the bubbles such that the region will not be mistakenly processed by the level set method; and
   d) restituting the droplets or bubbles into the grid-based fluid model.

14. The method of claim 13, wherein the droplets or bubbles in the step of simulating the region with Lagrangian motion experiences gravitational, drag forces, and pressure from the surrounding fluid, $$f = m_f g + \alpha_d r^2 (\bar{u} - \dot{x})\|\bar{u} - \dot{x}\| - V_f \nabla p,$$

where $m_f$ is the mass, $V_f$ is the volume, $\alpha_d$ is the drag coefficient, r is the radius, $\dot{x}$ is the current velocity of the droplet or bubble, and $\bar{u}$ is the interpolated velocity of the grid-based fluid measured at the center of the droplet or bubble.

15. The method of claim 13, wherein the step of restituting the droplets or bubbles comprises steps of:
   a) locating the droplets or bubbles in which the volume of the droplet or bubble is larger than at least two times the cell size; and
   b) removing the droplet or bubble, updating the level set values by $\phi(x_i) = s_p(r_p - |x_i - x_p|)$, and setting the grid point velocities to the velocity of the droplet or bubble, wherein $s_p = +1$ for the case of liquid droplet and $-1$ for the case of gas bubble, $r_p$ is the radius of the droplet or bubble, $x_p$ is the center of the droplet or bubble, and $x_i$ is the grid point being updated.

16. The method of claim 13, wherein the step of restituting the droplets or bubbles comprises steps of:
   a) locating the droplet or bubble which hits the surface or moves into the same phase fluid;
   b) updating the cell velocity by taking the average of the previous cell velocity and the velocity of droplet or bubble; and
   c) determining the new level set values for the cells covering the droplet or bubble using the volume of the droplets or bubbles.

17. The method of claim 1, further comprising steps of:
   a) generating multiple droplets or bubbles of smaller size to produce splashes and bubbles of smaller scales;
   b) modeling the geometrical shape of the droplet or bubble as an ellipsoid, wherein the eccentricity of the ellipsoid depends on the velocity of the droplet or bubble; and
   c) assigning to the surfacing bubbles a life time that is inversely proportional to the bubble size.

18. The method of claim 1, further comprising a step of reinitializing the level set values to maintain the signed distance property using $$\frac{\partial \phi}{\partial \tau} + sgn(\phi)(|\nabla \phi| - 1) = 0,$$

where $\tau$ is a fictitious time and $sgn(\phi)$ is a smeared signum function given by $$sgn(\phi) = \frac{\phi}{\sqrt{\phi^2 + |\nabla \phi|^2 (\Delta x)^2}}.$$

19. The method of claim 1, further comprising a step of simulating interaction with rigid objects, wherein the step comprises steps of:
   a) removing the normal component of the fluid velocity vector on the surface of the rigid objects;
   b) applying the total external force F and moment T acting on tire center or mass $r_c$ of the rigid body as $$F = Mg + \sum_s (-\nabla p_s \cdot n_s) n_s \Delta S,$$

$$T = \sum_s (r_s - r_c) \times (-\nabla p_s \cdot n_s) n_s \Delta S,$$

where M is the mass of the object, s is the index ranging over the marked cells, $p_s$ is the fluid pressure of the cell, $r_s$ is the position of the cell, $n_s$ is a normal vector to the surface, and $\Delta S$ is the area of the object surface subsumed in the cell.

20. A system for simulating stable but non-dissipative water comprising the modules for:
   a) modeling multiphase materials with grid of nodes;
   b) describing liquid and gas with a set of nonlinear partial differential equations, incompressible Navier-Stokes equations, that describe the flow of the fluids;
   c) representing the liquid-gas interface as an implicit surface using the level set equation;
   d) determining properties of the materials, from the information about the liquid-gas interface, including the surface curvature and the surface tension;
   e) solving the incompressible Navier-Stokes equations and the level set equation at each time step;
   f) advecting the level set according to the level set equation;
   g) updating the velocity by solving the Navier-Stokes equations;
   h) identifying the droplets and bubbles, simulating the region with Lagrangian motion based on particle dynamics, reducing the level set values of the region to values that are small for the droplets and negating the original level set values for the bubbles such that the region will not be mistakenly processed by the level set method, and restituting the droplets or bubbles into the grid-based fluid model;
   i) locating the droplets or bubbles in which the volume of the droplet or bubble is larger than at least two times the cell size, and removing the droplet or bubble, updating the level set values by $\phi(x_i) = s_p(r_p - |x_i - x_p|)$, and setting the grid point velocities to the velocity of the droplet or bubble, wherein $s_p = +1$ for the case of liquid droplet and $-1$ for the case of gas bubble, $r_p$ is the radius of the droplet or bubble, $x_p$ is the center of the droplet or bubble, and $x_i$ is the grid point being updated;
   j) locating the droplet or bubble which hits the surface or moves into the same phase fluid;
   k) updating the cell velocity by taking the average of the previous cell velocity and the velocity of droplet or bubble;
   l) determining the new level set values for the cells covering the droplet or bubble using the volume of the droplets or bubbles;
   m) removing the normal component of the fluid velocity vector on the surface of the rigid objects;
   n) applying the total external force F and moment T acting on the center of mass $r_c$ of the rigid body as $$F = Mg + \sum_s (-\nabla p_s \cdot n_s) n_s \Delta S,$$

$$T = \sum_s (r_s - r_c) \times (-\nabla p_s \cdot n_s) n_s \Delta S,$$

where M is the mass of the object, s is the index ranging over the marked cells, $p_s$ is the fluid pressure of the cell, $r_s$ is the position of the cell, and $\Delta S$ is the area of the object surface subsumed in the cell; and
   o) compensating the liquid volume by $\Delta V_i = V_0 - V_i$ at the end of each simulation step, wherein the initial volume $V_i$ and the area of liquid surface $S_i$ are calculated as $$V_i = \int_\Omega H(\phi(x)) dx \approx \sum H_\varepsilon(\phi(x)) \Delta x \Delta y \Delta z + V_p,$$

$$S_i = \int_\Omega \delta(\phi(x)) |\nabla \phi(x)| dx \approx \sum \delta_\varepsilon(\phi(x)) |\nabla \phi(x)| \Delta x \Delta y \Delta z,$$

where $V_p$ is the total volume of the droplets.

* * * * *